Figure 1:
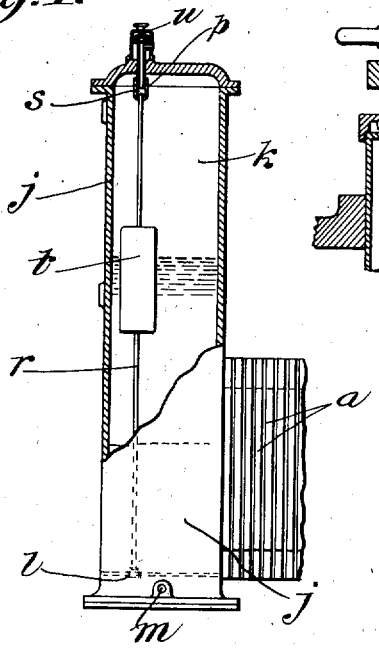

R. MORITZ.

ELECTROLYTIC DEVICE FOR GENERATING OXYGEN AND HYDROGEN.

APPLICATION FILED SEPT. 24, 1912.

Reissued Nov. 11, 1913. 13,643.

Attest:

C. Mitchell

Eugene Wening.

René Moritz

Inventor:

by Frank P. Wentworth his Atty.

UNITED STATES PATENT OFFICE.

RENÉ MORITZ, OF WASQUEHAL, FRANCE, ASSIGNOR TO L. HELLER & SON, OF NEW YORK, N. Y., A FIRM.

ELECTROLYTIC DEVICE FOR GENERATING OXYGEN AND HYDROGEN.

13,643. Specification of Reissued Letters Patent. Reissued Nov. 11, 1913.

Original No. 981,102, dated January 10, 1911, Serial No. 518,194. Application for reissue filed September 24, 1912. Serial No. 722,130.

*To all whom it may concern:*

Be it known that I, RENÉ MORITZ, a citizen of the Republic of France, residing at Wasquehal, Nord, France, have invented certain new and useful Improvements in Electrolytic Devices for Generating Oxygen and Hydrogen, of which the following is a specification, reference being had therein to the accompanying drawings, which form a part thereof.

My invention relates to electrolytic devices for generating pure oxygen and hydrogen, and more particularly to those features thereof whereby the purity of these gases is preserved.

The main object of the invention is to provide an electrolytic apparatus for producing oxygen and hydrogen wherein the off-take will be so arranged as to preclude any possibility of the admixture of the two gases in the apparatus, thus permitting the production of pure gases; and wherein this result can be secured even though through carelessness or mistake a joint is not properly made.

A further object is to provide an apparatus of this character wherein the electrodes may be so compactly arranged as to bring all of the electrolyte into such relation to the electrodes as to minimize the internal resistance in each cell, and thus increase the efficiency of the apparatus.

A still further object is to provide an apparatus of this character wherein the effective surface of the electrodes of a given dimension will be so increased as to lend greater capacity to the apparatus.

A still further object is to provide an apparatus wherein the diaphragm will serve to separate and pack the adjacent electrodes to preclude any possibility of leakage from adjacent to one electrode to adjacent to the next adjoining.

A still further object is to provide an apparatus of this character composed of a plurality of units, wherein the electrodes and the off take ducts will be independently packed, and the latter projected from the former in a manner to cause any leakage to be into the atmosphere so as to prevent a commingling of the gases in the apparatus.

A still further object is to provide an apparatus capable of delivering the gases under a high pressure.

A still further object is to provide an apparatus of this character wherein the electrolyte will be circulated through the apparatus about the electrodes in a manner to secure high efficiency, and always keep the electrodes covered with the electrolyte.

A still further object is to provide an apparatus of the character herein described wherein there will be provided means for excluding dirt and sediment from about the electrodes, thus permitting the use of rain water if desired. And a still further object is to provide an apparatus of this character wherein the hydrogen and oxygen gases will flow from about the electrodes to independent storage tanks provided with automatically acting means for equalizing the pressure in said tanks in order to preserve uniform conditions throughout the apparatus.

The invention consists in the novel features of construction and combination of parts hereinafter set forth and described, and more particularly pointed out in the claims hereto appended.

Figure 6:
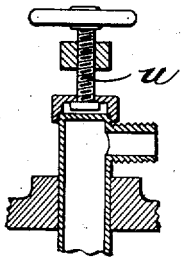
Figure 2:
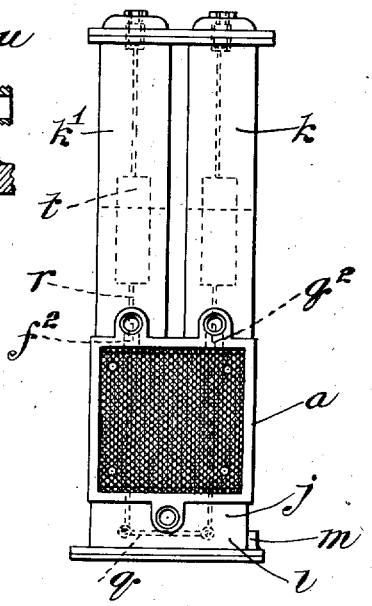
Figure 3:
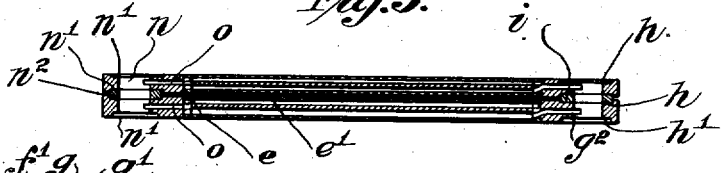
Figure 4:
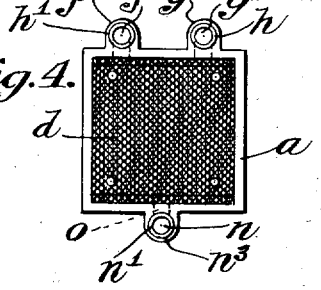
Figure 5:
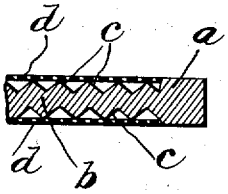

Referring to the drawings:—Figure 1 is a side elevation of an electrolytic apparatus embodying my invention, a portion of the tank electrode being broken away; Fig. 2 is an end elevation of said apparatus; Fig. 3 is a vertical section of two adjoining electrodes; Fig. 4 is a detail view of one of the electrodes detached from the apparatus; Fig. 5 is a fragmentary detail view in horizontal section of one of the electrodes; and Fig. 6 is a detail view of one of the valves of the pressure equalizing mechanism.

Like letters refer to like parts throughout the several views.

In the practice of my invention, I employ in a single apparatus, a plurality of units capable of being united in a manner to permit extension or reduction of the apparatus as desired. Each of these units is similar to every other unit with the exception of the heat unit which may be and preferably is in the form of a tank adapted to receive the electrolyte to be circulated throughout the apparatus and to receive the gases produced in the apparatus in a manner to prevent the commingling thereof.

Each of the similar electrodes above referred to comprises a frame *a* which is preferably rectangular. This frame supports a plate $b$ which is supported with and closes said frame and may be an integral part thereof, formed of any suitable material. To secure a greater effective surface, this plate, which constitutes the electrode, is provided with corrugations $c$, (see Fig. 5) and extending across these corrugations is a metallic mesh $d$ which has the two-fold function of increasing the effective surface of the electrode, and protecting the plate $b$. This screen may be made of any suitable material not attacked by the alkali or oxygen. The apparatus is composed of a plurality of these electrodes suitably secured together, the frames $a$ being insulated one from the other by the diaphragm $e$ more particularly described hereinafter.

The frame $a$ on the top thereof, is provided with a plurality of lugs or extensions $f$ $g$ having therethrough respectively a duct $f'$ $g'$ communicating through the passages $f^2$ $g^2$ with opposite sides of the plate $b$ so as to permit hydrogen to escape from adjacent to the negative pole of this plate to the duct $g'$ and oxygen to escape from adjacent to the positive pole to the duct $f'$. These lugs or extensions $f$ $g$ project to an extent beyond the frame $a$ sufficient to cause any gas escaping from the ducts $f'$ $g'$ to pass directly to atmosphere and thus avoid any possibility of the commingling of the two gases in the apparatus. Furthermore, the exposure of these lugs or extensions in the manner described, makes detection of a leak possible, as the escape of gas is always accompanied by an escape of the electrolyte.

Each lug or extension $f$ $g$ has formed upon opposite sides thereof countersunk packing seats $h$ $h'$, adapted to receive the resilient packing ring $i$ extending about the ducts $f'$ $g'$. These packing rings in addition to forming a tight joint between the lugs or extensions of adjoining frames $a$, space these lugs apart sufficiently to insure in conjunction with the diaphragm $e$, a perfect insulation of the various frames $a$. The lugs or extensions $f$ $g$ are similarly positioned on each frame so that when these frames are assembled all of the ducts $f'$ or $g'$ will be alined to form a continuous channel from one end of the apparatus to its receiving tank.

The diaphragm $e$ comprises oppositely disposed asbestos sheets, with another part $e'$ having the rectangular or square shape of the plate $b$ disposed between them. The part $e'$ is for the purpose of reinforcing and stiffening the diaphragm $e$ and may be of any desired material which is electro-conductive, or capable of being made so by absorbing the electrolyte. This construction is designed to permit the asbestos portions to readily absorb the electrolyte, thus reducing the resistance in the apparatus, while preventing the escape of gas through the diaphragm by reason of the interposed member which may be of any suitable relatively less porous material. The diaphragm $e$ does not extend into engagement with the rings $i$ thus resulting in two independent packings, one for the frames $a$, and the other for the lugs or extensions $f$ $g$.

The head electrode comprises a tank $j$ having two upwardly extending, non-communicating chambers $k$ $k'$, one of which, $k$, is adapted to receive and store oxygen delivered thereinto from the duct $f'$, and the other of which is adapted to receive and store hydrogen, delivered thereinto from the duct $g'$. The lower portion $j$ of the tank is common to both chambers $k$ $k'$, and is dropped below the level of the bottom of the frames $a$ to an extent sufficient to form a settling tank $l$ adapted to accumulate sediment and prevent its flowing about the electrodes.

The ducts $f'$ $g'$ communicate with the chambers $k$ $k'$ well above the electrolyte tank so as to prevent an admixture of the gases while in these tanks.

To permit the cleansing of the settling tank $l$, I provide a drain cock $m$.

To secure the desired circulation of the electrolyte about the various electrodes $b$, I provide each frame $a$ with a passage $n$ adjacent to the bottom thereof, which passage is adapted to aline with similar passages in all other frames $a$. About each such passage is a countersunk portion $n'$ in the frame adapted to receive a packing gasket $n^2$ similar to the gasket $i$. To facilitate the assembling of the apparatus, I form a lug or extension $n^3$ on the bottom of each frame through which this passage extends. This passage $n$ is in communication with both sides of the electrode $b$ by means of the channel $o$.

The normal level of the electrolyte is well above the tank $j$ so as to cause the various electrodes to be always submerged therein. In order to preserve the same level in both chambers $k$ $k'$, and thus prevent back pressures which might result in the leakage of gas from one chamber to the other, I provide automatic pressure regulating means for these tanks which I will now describe.

Leading from each chamber $k$ $k'$ is a blow-off valve $p$, the inlet of which opens into the chamber $k$ or $k'$ and the outlet of which may open into atmosphere or into a suitable storage tank as required.

Mounted adjacent to the bottom of the tank $j$ is a walking beam $q$ (see Fig. 2), each end of which is connected with a rod $r$ carrying a valve block $s$ controlling the inlet of a valve $p$. Mounted on each rod $r$ and movable therewith in the chambers $k$ $k'$ respectively is a float $t$, the movement of which is controlled by the electrolyte in the chambers $k$ $k'$. By the construction described a variance in the pressures in either chamber $k$ $k'$ will result in a lowering of the water level in that chamber and a resultant opening of the valve $p$ until this level has been restored. When the offtake valve $p$ in one chamber $k$ is open to reduce the pressures in said chamber, the walking beam $q$ will close the valve $p$ in the other chamber so as to simultaneously and automatically raise the pressures in that chamber and thus equalize the pressures in both chambers $k$ $k'$. The length of the floats $t$ will compensate for the simultaneous lowering of the level in both tanks resulting from the use of the apparatus. The valve $p$ may be set to any pressure by means of the screw threaded stem $u$.

The operation of the herein described apparatus is substantially as follows:—A number of frames $a$ with their electrodes $b$ having been assembled in the manner shown, the electric current is charged into the last unit and the negative terminal is connected with the tank $j$. The flow of the current will thus be through all of the units, the diaphragm and the electrolyte about same in series, the decomposition of the alkaline electrolyte resulting in the presence of pure oxygen adjacent to one side of each electrode $b$ and pure hydrogen adjacent to the other side of the electrode, the diaphragms $e$ preventing the commingling of these gases. The close relation of the various electrodes $b$ eliminates any material volume of electrolyte in a neutral zone between these electrodes, thus reducing the internal resistance of the apparatus without any loss of efficiency. As the oxygen and hydrogen are thus freed through the decomposition of the electrolyte, the gases will flow respectively through the passages $f^2$ $g^2$ to the ducts $f'$ $g'$, and thence to the tanks $k$ $k'$ respectively. Should there be a leak about any joint formed by the gaskets $i$, the gas escapes directly into atmosphere, and the electrolyte escaping with the gas will be visible exteriorly of the apparatus. The decomposition of the electrolyte will result in a circulation thereof from the tank $j$ through the passage $n$ and channel $o$ to and about each electrode, and through the passages $f^2$ $g^2$ and ducts $f$ $g$ to the tanks $k$ $k'$ respectively, where it will be restored to the electrolyte in the storage tank which is in direct communication with the bottom of said gas tanks.

The operation of the automatically acting relief valve mechanism has been heretofore described. If it be desired to set the valve to any desired pressure, it is merely necessary to raise or lower the stem $u$, which will determine the quantity of movement of the floats $t$ necessary to open the valve $p$ and hence permit a variance of pressure in either tank before the valve mechanism will operate.

Through the equalization of the pressures in the chambers $k$ $k'$, the further material advantage is secured, to wit:—an equalization of the pressures on opposite sides of the respective diaphragms, and the elimination of likelihood of the gas filtering through the diaphragm, thus supplementing the action of the part $e'$ in avoiding the porosity of the asbestos parts of the diaphragm resulting in the passage of gas from adjacent to one electrode to adjacent to the next adjoining electrode.

Having described my invention, what I claim as new and desire to have protected by Letters Patent, is:—

1. An electrolytic apparatus of the character described embodying therein an electrode, means forming two independent isolated ducts communicating respectively with opposite sides of said electrode, said means being projected from the exterior of said electrodes and distanced one from the other whereby a leakage of gas from one to the other is prevented, and means whereby an electrolytic fluid is delivered adjacent to the bottom, and caused to circulate about both sides, of said electrode.

2. An electrolytic apparatus of the character described embodying therein an electrode comprising a frame, a plate carried within and closing said frame, two isolated lugs or extensions having ducts therethrough projecting from the top of said frame and distanced one from the other, said frame having independent non-communicating channels leading from said ducts respectively to opposite sides of said plate, and means whereby an electrolytic fluid is delivered adjacent to the bottom, and caused to circulate about both sides, of said plate.

3. An electrolytic apparatus of the character described embodying a plurality of electrodes arranged in series, each being provided with means forming two independent isolated ducts communicating respectively with opposite sides of said electrode, said means being exposed exteriorly of said electrode and distanced one from the other whereby a leakage of gas from one duct to the other is prevented, and with means whereby an electrolytic fluid is delivered adjacent to the bottom, and caused to circulate about both sides, of said electrode, means spacing said electrodes apart, a diaphragm held by said means between contiguous electrodes, and means packing said means respectively.

4. An electrolytic apparatus of the character described embodying therein a plurality of electrodes arranged in series, each comprising a frame whereby contiguous electrodes are spaced apart, a plate carried within and closing said frame, two isolated lugs or extensions having a duct therethrough, projecting from the top of said frame and distanced one from the other, said frame having independent, non-communicating channels leading from said ducts respectively to opposite sides of said plate, and means whereby an electrolytic fluid is delivered adjacent to the bottom, and caused to circulate about both sides, of said plate, a diaphragm held by said frame between contiguous plates, and means packing said lugs or extensions about said ducts and said means delivering electrolytic fluid about said plate.

5. An electrolytic apparatus of the character described embodying therein an electrode comprising a frame, a plate carried within and closing said frame, a metallic screen carried by said frame upon the face of said plate, two isolated lugs or extensions having ducts therethrough projecting from the top of said frame, said frame having independent non-communicating channels leading from said ducts respectively to opposite sides of said plate, and means whereby an electrolytic fluid is delivered adjacent to the bottom, and caused to circulate about both sides, of said plate.

6. An electrolytic apparatus of the character described embodying therein an electrode comprising a frame, a plate having corrugated faces carried within and closing said frame, a metallic screen carried by said frame upon the face of said plate, two isolated lugs or extensions having ducts therethrough projecting from the top of said frame, said frame having independent non-communicating channels leading from said ducts respectively to opposite sides of said plate, and means whereby an electrolytic fluid is delivered adjacent to the bottom, and caused to circulate about both sides, of said plate.

7. An electrolytic apparatus of the character described embodying a plurality of electrodes arranged in series, each being provided with means forming two independent isolated ducts communicating respectively with opposite sides of said electrode, said means being exposed exteriorly of said electrode whereby a leakage of gas from one duct to the other is prevented, and with means whereby an electrolytic fluid is delivered adjacent to the bottom, and caused to circulate about both sides, of said electrode, means spacing said electrodes apart, a diaphragm consisting of two absorbent sheets with an interposed part held by said means between contiguous electrodes, and means packing said means forming said isolated ducts, and delivering electrolytic fluid about said electrode respectively.

8. An electrolytic apparatus of the character described embodying an electrode provided at the top with extensions having each a duct and channels placing the ducts in the said extensions in communication with opposite sides of the electrode, and the electrode also having at the bottom an extension provided with a channel in communication with both sides of the electrode.

9. An electrolytic apparatus of the character described embodying electrodes, extensions on said electrodes provided with holes adapted to form ducts when the extensions are joined together, means for joining together the extensions independently of the joint between the electrodes, a settling tank containing the electrolyte for the electrodes, and means for draining off impurities from said tank.

10. An electrolytic apparatus of the character described embodying a plurality of electrodes arranged in series, each being provided with means forming two independent isolated ducts communicating respectively with opposite sides of said electrode, said means being exposed exteriorly of said electrode whereby a leakage of gas from one duct to the other is prevented, and with means whereby an electrolytic fluid is delivered adjacent to the bottom, and caused to circulate about both sides, of said electrode, means spacing said electrodes apart, a diaphragm held by said means between contiguous electrodes, means packing said means respectively, and automatically acting pressure regulating means whereby the pressure on both sides of each diaphragm is equalized.

11. An electrolytic apparatus of the character described embodying electrodes, extensions on said electrodes provided with holes adapted to form a continuous duct when the extensions are joined together, channels connecting one duct to one side of each of the electrodes, and the other duct to the other side of each of the electrodes respectively, a tank containing electrolyte, means to connect each of the electrode-extension ducts to one of the chambers, a relief valve and a float in each chamber, and means for connecting the valves with the floats whereby a change in the level of the fluid electrolyte in either of said chambers will vent that chamber.

In witness whereof I have hereunto affixed my signature, in the presence of two subscribing witnesses, this 7th day of September 1912.

RENÉ MORITZ.

Witnesses:
ALFRED C. HARRISON,
M. MEYER.